United States Patent

Lin

[11] Patent Number: 5,874,947
[45] Date of Patent: Feb. 23, 1999

[54] PORTABLE INFORMATION RECORDING/ RETRIEVING SYSTEM FOR SELF SERVICE TRAVELERS

[76] Inventor: Alexis Lin, P.O. Box 82-144, Taipei, Taiwan

[21] Appl. No.: 844,101

[22] Filed: Apr. 28, 1997

[51] Int. Cl.[6] .............................. G08C 21/00; G09G 5/00
[52] U.S. Cl. ...................... 345/169; 345/901; 178/18.03; 178/19.05
[58] Field of Search ..................................... 345/156, 169, 345/172, 173, 901; 178/18.01, 18.03, 19.01, 19.03, 19.05; 348/220, 232, 333, 334, 375, 376; 386/38, 118; 358/906, 909.1

[56] References Cited

U.S. PATENT DOCUMENTS

| | | | |
|---|---|---|---|
| 5,497,194 | 3/1996 | Sakagami et al. | 348/232 |
| 5,534,921 | 7/1996 | Sawanobori | 348/333 |
| 5,646,649 | 7/1997 | Iwata et al. | 345/173 |
| 5,661,506 | 8/1997 | Lazzouni et al. | 345/179 |

*Primary Examiner*—Vijay Shankar
*Attorney, Agent, or Firm*—A & J

[57] ABSTRACT

A portable recording/retrieving system for self services travelers includes the following information input devices: writing board/light pen, CCD (charged coupled device) camera, and wireless microphone. These input devices may be used for inputting pictures, images, scenery, words and audio information. The input information will be processed by microprocessor and will be stored in CD or memory; light pen/writing board is used to input the words and pictures; the CCD camera, located at the front of the unit, is used for picking up pictures, scenery, words; the wireless microphone, located at the top of the light pen, is used for picking up audio information. The audio information will be digitized by an analog/digital converter and the microprocessor will process and store the digitized audio information into the main memory or CD, so that the travelers can view/hear the stored information anytime.

1 Claim, 5 Drawing Sheets

PORTABLE INFORMATION RECORDING/RETRIEVING SYSTEM FOR SELF SERVICE TRAVELERS

BACKGROUND OF THE INVENTION

1. Field of the Invention

This invention is related to a portable recording/retrieving system. It utilizing CD for storage, light pen for hand writing input, CCD Camera for picking up pictures, images, scenery and words, wireless earphone and wireless microphone for output/input of audio information, LCD display screen for output of pictures, images and words.

2. Description of the Prior Art

Due to the economic development and the improvement in our living standard, traveling has become one of the best leisure choices for the people nowadays. The conventional ways of recording the scenery, special cultural features of the locals and the happenings while traveling would consume a lot of photo-films, papers; and it is not easy to store and retrieve the recorded information. The conventional recording methods not only waste a lot of earth resources, it also inconvenient for filing and retrieving. With the improvement of the technology, the CD may be used to store the kinds of information(pictures, images, scenery, words and audio); LCD is used for displaying the pictures, images scenery and words; wireless earphone is used for reproduce the recorded audio information; CCD camera is used to pickup the pictures, images, scenery, words; wireless microphone is used to pickup the audio information; light pen and writing board is used for inputting words and pictures.

SUMMARY OF THE INVENTION

This invention is a portable information recording/retrieving system for self service travelers. Especially it can be bring along with the travelers, the travelers can use hand writing, camera or microphone for inputting, pictures, scenery, words and voice information. The inputted information can be stored in the main memory or CD.

When traveling around, for recording of the scenery, special features of the local people the travelers will usually use a camera or video recorders or sometime use pens for recording the related cultural background information. These methods need a lot of photo films and papers; the photo films need to be processed at later time. It is not convenient for revising/reading/viewing the records. Especially for the recent time, self service traveling is well accepted by most young people, but they can not bring too much luggage with them for traveling around. It is very troublesome to do the recording of the happenings during traveling around.

The main purpose of the invention is to provide a portable recording/retrieving system for self service travelers. This unit is housed in a system box, it contains a writing board, CCD camera and wireless microphone input devices for inputting the pictures, images, scenery, words and audio information; these information will be stored into main memory or CD. The writing board is located on the surface of the LCD display screen. Travelers can use light pen write on the surface of the writing board, the input is converted into information that can be processed by microprocessor and will be stored into the memory of the system. The traveler can display the stored pictures, images or words anytime. The use of paper is eliminated. The second purpose of this invention is the use of a CCD camera, located at the front of the system for picking up pictures, images scenery or words; a interface controller will convert the video signal from the CCD camera into digital signal, the microprocessor will process the digitized video signal and store it into the CD. The traveler can display the stored pictures/images/scenery/words on the LCD display screen; it saved the use of photo-films.

Another purpose of this invention is the use of a wireless microphone, located on the top of the light pen for recording audio information. A high frequency carrier is used to transmit the audio information to the receiver, an analog/digital converter is used to convert the audio information into digital information, the microprocessor will process and store the digitized audio signal into memory of the system. This feature is good for travelers to record information in audio format while hand writing is not appropriate; i.e. traveling by car on a rocky road. The traveler can listen to the recorded information by using wireless earphone. This feature improves the inconvenience of the common magnetic tape recorders.

DETAILED DESCRIPTION OF THE PREFERRED EMBODIMENT

Figure 1:
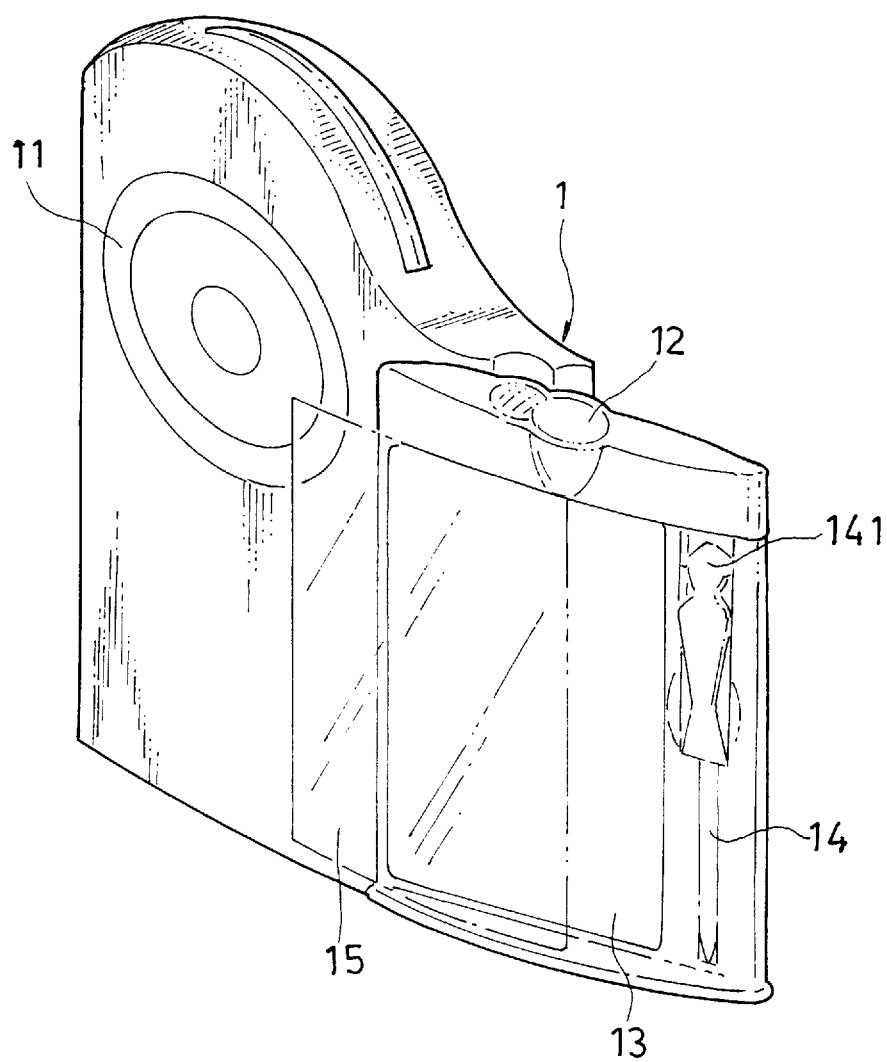
FIG. 1 is a perspective view of the present invention.

With reference to FIG. 1, the present invention comprises a system box (1), a CD drive (11), a CCD (Charged Coupled Device) camera (12), a LCD (Liquid Crystal Display) display screen (13), a writing board located on the top of the LCD display screen (13), a light pen (14) for writing on the writing board for recording information, a wireless microphone (141) located on the top of the light pen (14), LCD display screen (13), a transparent protecting cover (15) is used for protecting LCD display screen (13) and light pen (14), the CCD camera is used for picking up the pictures, images, scenery or words in video forms, the video information will be stored in the memory or CD of the system, the traveler can display the stored information (pictures, images, scenery or words) on the LCD display screen anytime.

Figure 2:
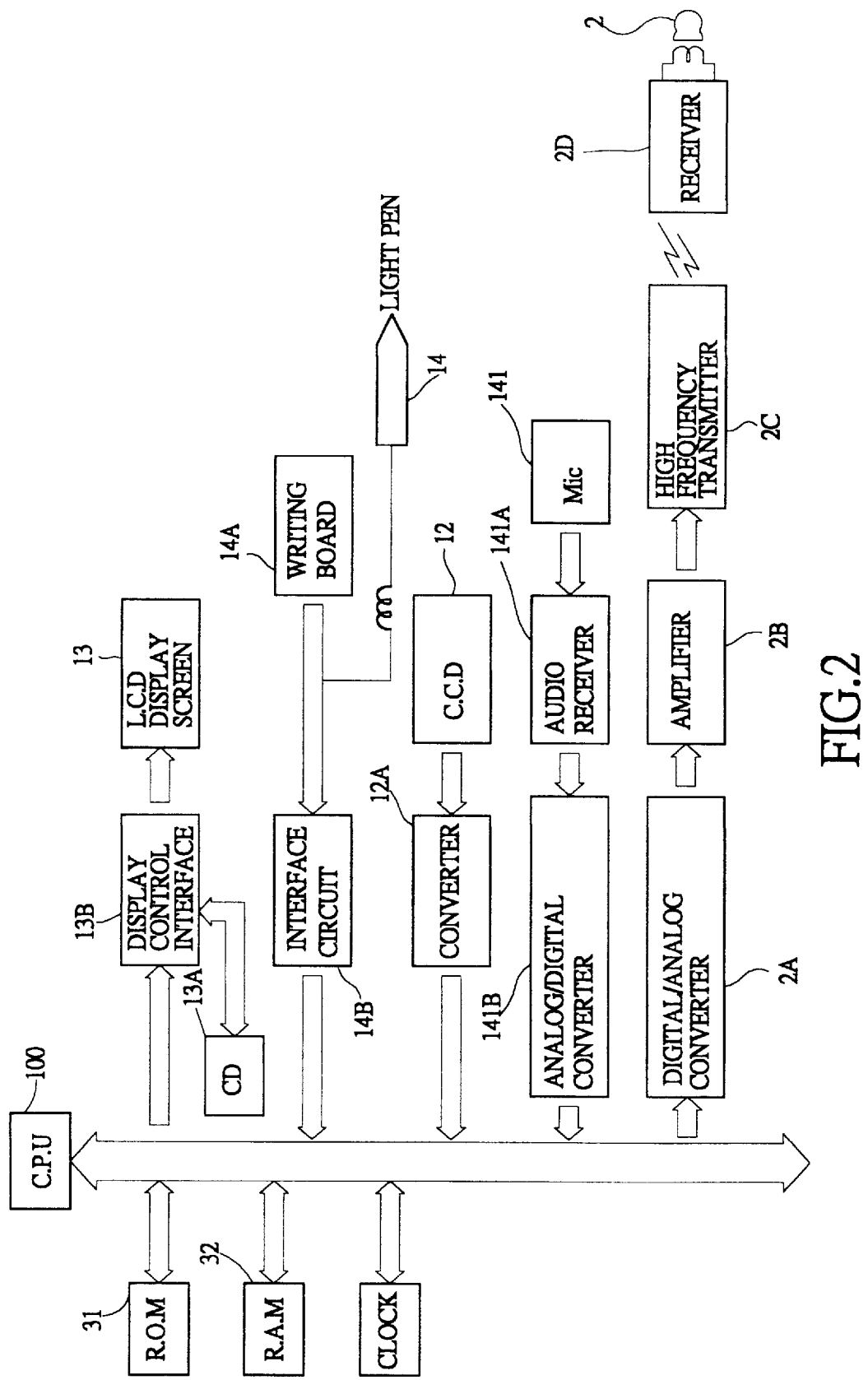
FIG. 2 is a system architectural block diagram of the present invention.

Referring to FIG. 2, this is the system architecture block diagram of the present invention. The microprocessor (100) has connections to the following input devices: light pen (14), CCD camera (12) and wireless microphone (141). The light pen (14) is used for writing on the writing board (14A), the written information will be converted to digital information by the interface circuit (14B), the digitized information will be processed by microprocessor (100) and stored in the RAM (32) or CD (13A). The CCD camera (12) is used for pickup the pictures, images, scenery or words in video forms, the video information will be converted to digital signal by the interface circuit (12A), the digitized signal will be processed by microprocessor (100) and stored on the CD (13A). The wireless microphone (141) is used for picking up audio information, a high frequency carrier is used to transmit the audio information to the receiver (141A), the received audio information will be converted into digital signal by analog/digital converter (141B), the digitized audio information will be processed by microprocessor (100) and stored into RAM (32) or CD (13A).

The previous described recording action can be used for recording various forms of pictures, images, scenery or words, the recorded information will be stored in RAM (32) or CD (13A). When the traveler needs to read or display the recorded information, the microprocessor (100) will retrieve the information from ROM (31), RAM (32) or CD (13A), and display the information on the LCD display screen via display control interface (13B). The travelers can use this invention for recording or reading the recorded happenings while traveling around anytime.

Figure 3:
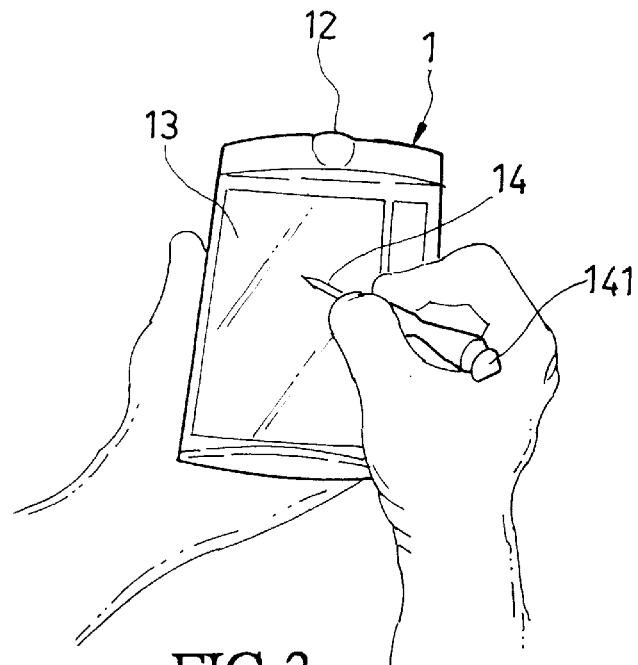
FIG. 3 illustrates the handwriting input of the present invention.
Figure 4:
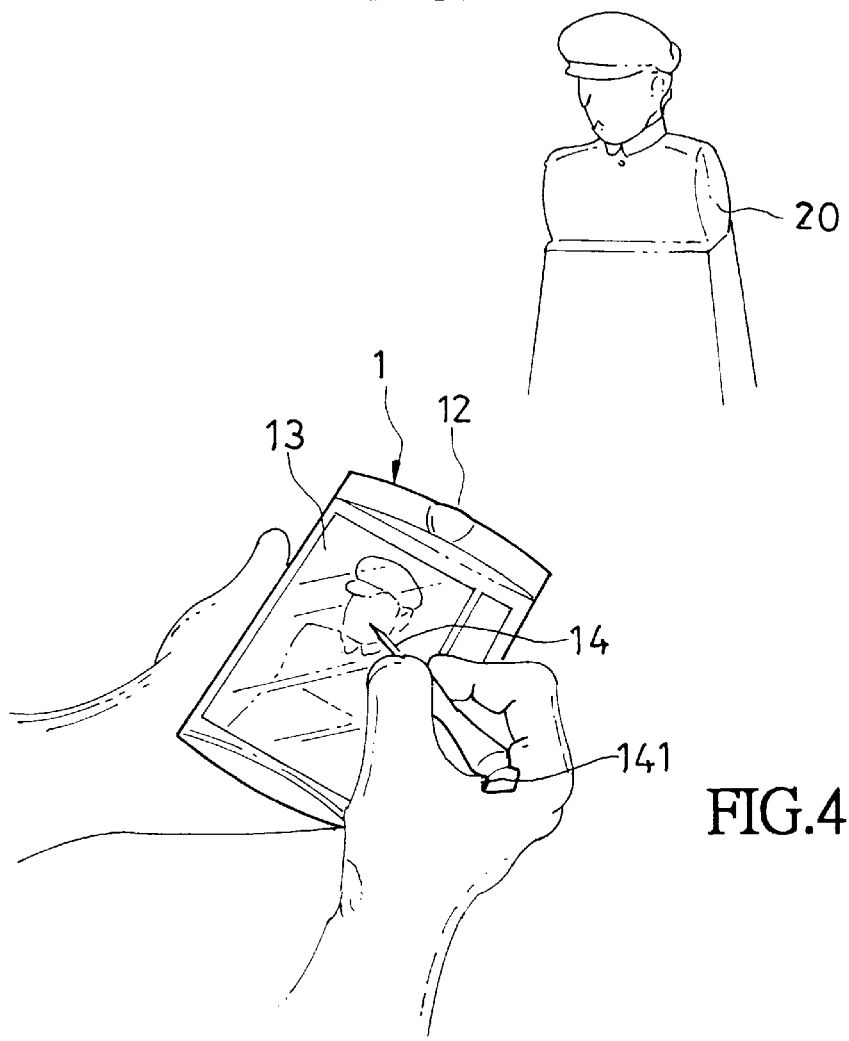
FIG. 4 illustrates the recording of pictures/images/scenery of the present invention.

With reference to FIGS. 2 and 3, these figures illustrate the use of handwriting method for inputting information, light pen (14) is used to write on the writing board surface (14A), which is on the top of LCD display screen (13), interface circuit (14B) will convert the information written on the writing board into digital signal, microprocessor (100) will store the information into RAM(32) or CD(13A). The traveler retrieve stored information anytime. Turning now to FIGS. 2 and 4, these figures illustrate the use of CCD camera for picking up pictures/images. The traveler use the CCD camera (12) focus on the target(20), the image of the target (20) will be displayed on the LCD display screen (13), then use the light pen (14) to trigger the process of storage of the image through converter (12A) and then store it onto the CD (13A).

Figure 5:
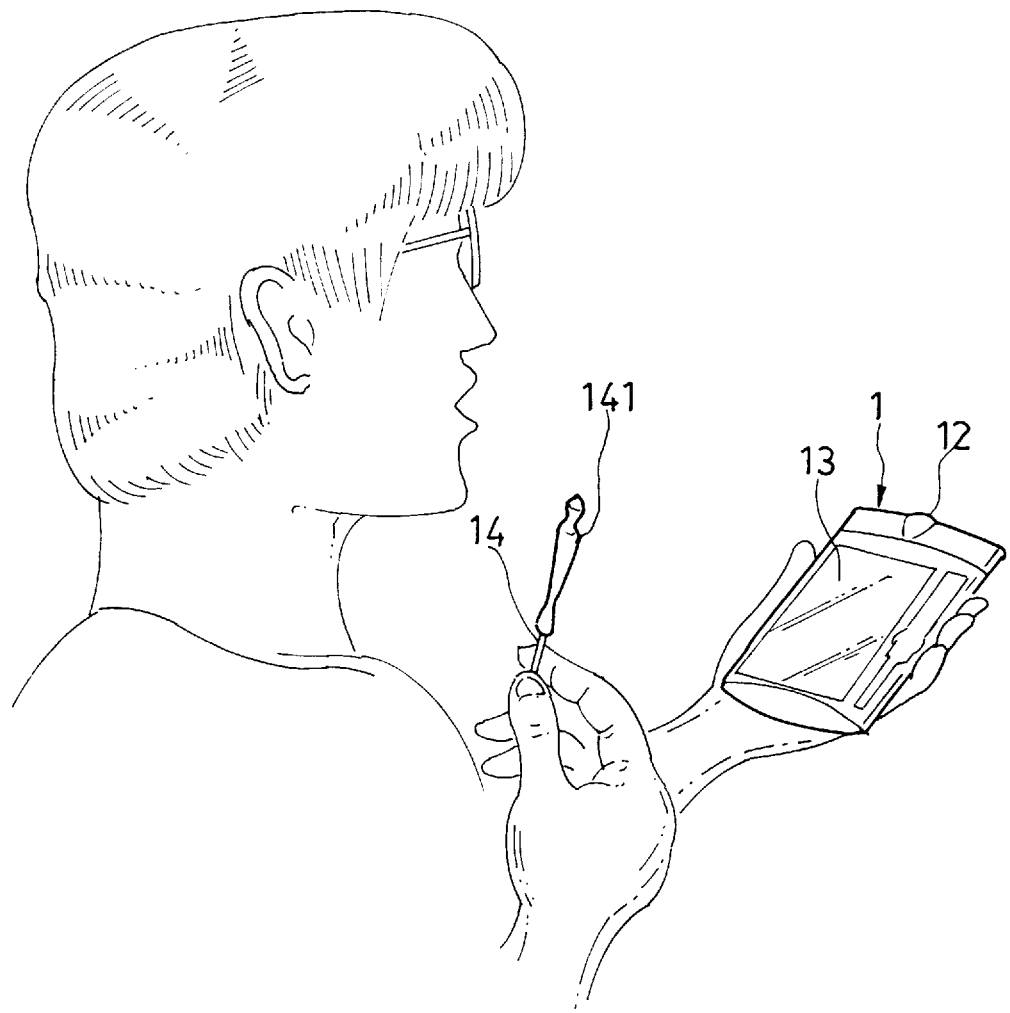
FIG. 5 illustrates the recording of audio information.

With reference to FIGS. 2 and 5, these figures illustrate the audio recording process. The traveler can speaks to the wireless microphone (141), which is located on the top of light pen (14), the audio information will be transmitted by a high frequency carrier and received by the audio receiver (14A) inside system box (1). The received audio information will be converted into digital signal by analog/digital converter (14B), this digital signal will be processed by microprocessor (100) and stored into RAM (32) or CD (13A).

Figure 6:
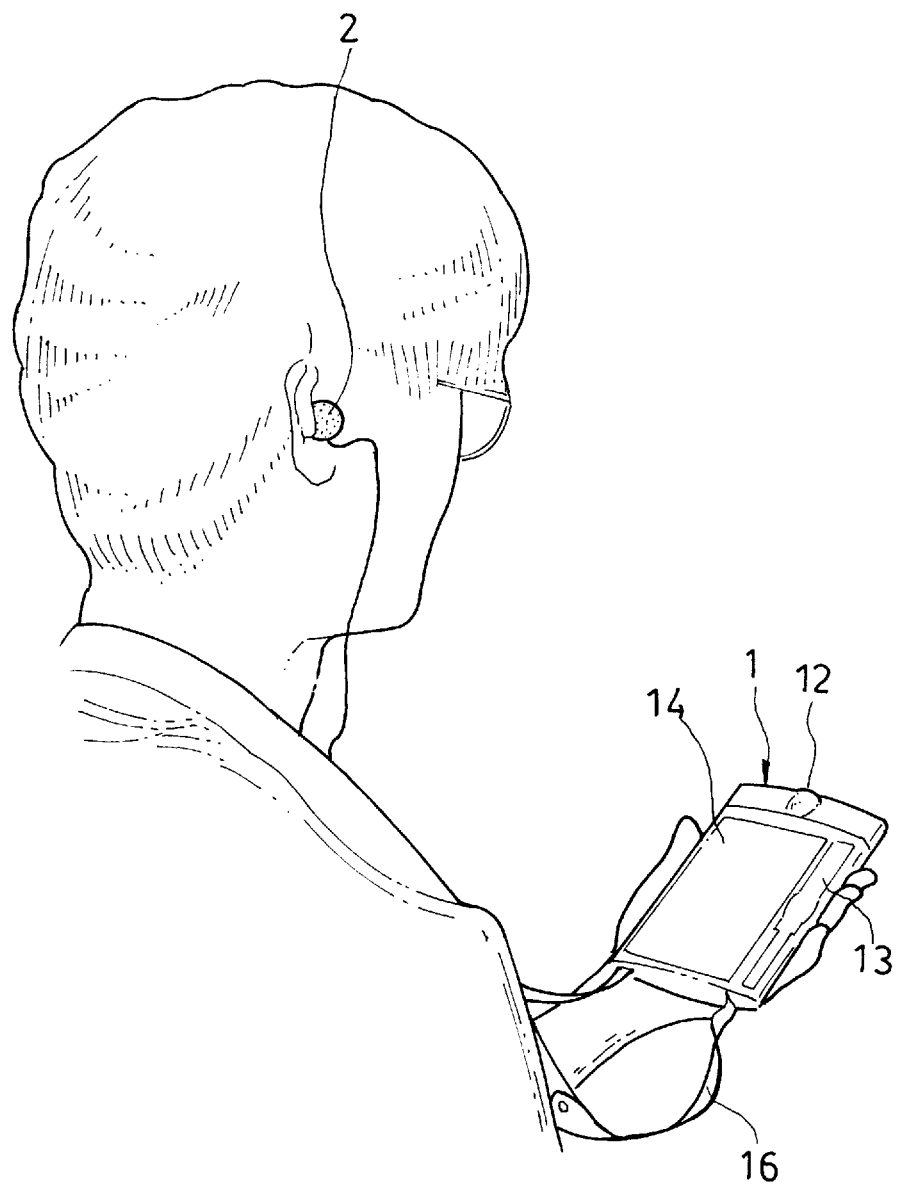
FIG. 6 illustrates the use of the wireless earphone.

As shown in FIGS. 2 and 6, these figures illustrate the retrieval of the recorded information. The information recorded via light pen/camera can be displayed on the LCD display screen (13), the audio information recorded via wireless microphone (141) will be retrieved by the microprocessor (100) from ROM (31), RAM (32) or CD (13A), the retrieved digital audio information will be converted back to audio signal by digital/analog converter (2A), and then the audio signal is amplified by amplifier (2B) transmitted to the receiver (2D) by a high frequency transmitter (2C). The earphone (2) will convert the received audio information from receiver (2D) into audible sound. A carrying belt (16) is attached to the back of the system box (1), so that the travelers hang the system on the proper place/part of body, that makes more convenient for carrying the system and recording/retrieving of information while traveling around.

In conclusion, this invention may be used to record words, pictures, images, scenery and audio information by using handwriting, camera or audio microphone. The information will be processed by microprocessor and stored into main memory or CD, the users can retrieve the stored information and display them on the LCD display screen or listen to the recorded audio information by using wireless earphone. This invention eliminates the inconvenience of the traditional paper recording, and provides simple operation, it is for sure is a very useful and a creative idea of recording of information while traveling around.

I claim:

1. A portable information recording/retrieving system comprising:

a system box;

a light pen for entering handwriting information on the writing board;

a writing board arranged on a surface of a display screen, a light pen is used to write the desired information on the surface of the writing board, an interface circuit will convert the written information into digital information so that the microprocessor will process it, and then the information will be stored in the main memory or CD;

a CCD(Charged Couple Device) Camera, located at the front of the system box, is used to picking up images of the pictures, scenery or words, the images will then be converted into digital signal by a converter, the microprocessor will process the converted digital signal and store them on CD;

a wireless microphone, located at the top of the light pen, is used to pickup audio information, the audio information will then be transmitted by high frequency carrier to the receiver of the system, the received audio information will then be converted into digital signal by analog/digital converter, the microprocessor will process the digitized audio information and store them into main memory or CD;

a CD drive with CD for storing information input from light pen/writing board, CCD camera, wireless microphone;

a wireless earphone, this earphone is used to convert the received audio information into audible sound, so that the traveler can hear stored audio information;

a LCD display screen, this display screen is used to display the input or retrieved information;

a microprocessor for processing the information from the input devices and processing the retrieved information from the main memory or CD, the processed information will be send to the output devices.

\* \* \* \* \*